(12) United States Patent
Kawamura

(10) Patent No.: US 6,383,115 B1
(45) Date of Patent: May 7, 2002

(54) LINE PRESSURE CONTROL DEVICE OF CONTINUOUSLY VARIABLE TRANSMISSION

(75) Inventor: Yasutaka Kawamura, Atsugi (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/672,984

(22) Filed: Sep. 29, 2000

(30) Foreign Application Priority Data

Sep. 30, 1999 (JP) .......................................... 11-278668

(51) Int. Cl.⁷ .............................................. B60K 41/16
(52) U.S. Cl. .............................. 477/50; 477/28; 477/37; 477/45
(58) Field of Search ............................. 477/50, 52, 70, 477/77, 37, 158, 159, 160

(56) References Cited

U.S. PATENT DOCUMENTS

| 4,653,007 A | * | 3/1987 | Osanai ..................... 364/424.1 |
| 4,781,655 A | | 11/1988 | Tezuka .......................... 474/28 |
| 5,643,132 A | * | 7/1997 | Inoue ........................... 476/10 |
| 6,007,452 A | * | 12/1999 | Sawada et al. ................ 477/45 |
| 6,168,547 B1 | * | 1/2001 | Kawamara ................... 477/156 |
| 6,292,730 B1 | * | 9/2001 | Takizawa et al. .............. 701/51 |

FOREIGN PATENT DOCUMENTS

| EP | 0 231 058 | 8/1987 |
| EP | 0 270 272 | 6/1988 |
| EP | 0 424 005 | 4/1991 |
| JP | 2-163562 | 6/1990 |
| JP | 04-078366 | 3/1992 |
| JP | 08-210449 | 8/1996 |
| JP | 11-247964 | 9/1999 |

* cited by examiner

Primary Examiner—Rodney H. Bonck
Assistant Examiner—Eric M. Williams
(74) Attorney, Agent, or Firm—Foley & Lardner

(57) ABSTRACT

A clutch (25, 26) which connects an engine to a toroidal continuously variable transmission (100) is engaged and transmits a torque to the transmission (100) according to a line pressure. The toroidal continuously variable transmission (100) transmits the torque also according to the line pressure. A microprocessor (81) calculates a first pressure required to engage the clutch (25, 26) in the idle running state of the engine (99), calculates a second pressure required for torque transmission of the clutch (25, 26) based on a torque transmission amount of the clutch (25, 26) (S141), and calculates a third pressure required for torque transmission of the continuously variable transmission (100) based on the torque transmission amount of the clutch (25, 26) and the speed ratio of the continuously variable transmission (100) (S142). Insufficiency of line pressure when the vehicle starts is prevented by controlling the line pressure to be equal to the maximum value of the first pressure, second pressure and third pressure when the load of the engine (99) is equal to a greater than a first set value until a first set time has elapsed after the supply of the line pressure to the clutch (25, 26) is started.

9 Claims, 7 Drawing Sheets

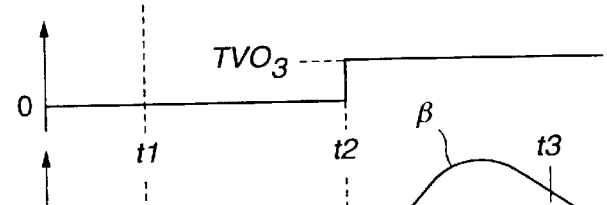
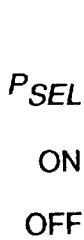
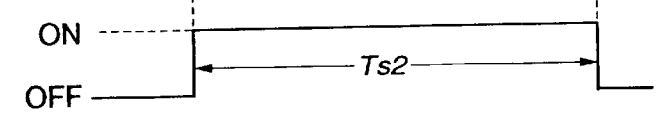
FIG. 7A
FIG. 7B
FIG. 7C
FIG. 7D
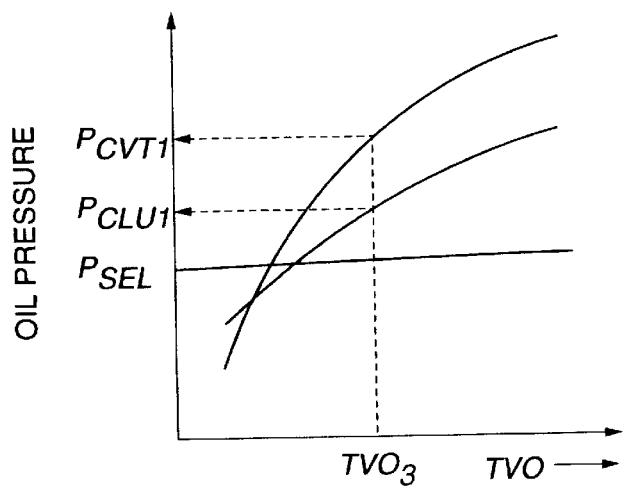
FIG. 8

LINE PRESSURE CONTROL DEVICE OF CONTINUOUSLY VARIABLE TRANSMISSION

FIELD OF THE INVENTION

This invention relates to oil pressure control when a vehicle equipped with an oil pressure clutch and a continuously variable transmission starts running.

BACKGROUND OF THE INVENTION

Tokkai Hei 8-210449 published by the Japanese Patent Office in 1996 discloses a device for controlling a line pressure supplied to a continuously variable transmission (referred to as CVT hereafter) for vehicles.

The CVT is connected to the engine via a clutch. The line pressure is obtained by adjusting the discharge pressure of an oil pump driven by the engine by a valve.

The line pressure is set according to an input torque of the CVT when the vehicle is running normally.

On the other hand, a basic engaging pressure is set independently to enable the engaging of the clutch in the idle running state of the engine. When a selector lever changes over to a drive range from a neutral range, for example, the control device maintains the line pressure at the basic engaging pressure over a predetermined period from the change-over.

SUMMARY OF THE INVENTION

The line pressure not only performs clutch engaging, but also supplies the engaging force required for the clutch to transmit torque and a pressure required for the continuously variable transmission to transmit torque.

If a driver depresses the accelerator pedal, the clutch engaging force required to transmit torque and the pressure required by the continuously variable transmission will also increase.

On the other hand, when the selector lever is changed over to the drive range from the neutral range, the line pressure is maintained at a value corresponding to the basic engaging pressure until a predetermined period elapses. Therefore, if the driver depresses the accelerator pedal in the predetermined period, the clutch can slip without fully obtaining the clutch engaging force required for torque transmission, or an unintended downshift may occur because the continuously variable transmission does not have sufficient pressure.

It is therefore an object of this invention to prevent an insufficiency of line pressure when there are various pressure demands when a vehicle starts.

It is a further object of this invention to quickly and smoothly engage a clutch when a vehicle starts.

In order to achieve the above objects, this invention provides a line pressure control device for such a vehicle that comprises an engine, a continuously variable transmission and a clutch. The transmission and the clutch are connected in series to the engine to transmit a torque according to a line pressure.

The line pressure control device comprises a valve which regulates the line pressure, a sensor which detects a load of the engine, a sensor which detects a torque transmission amount of the clutch, a sensor which detects a speed ratio of the continuously variable transmission, and a microprocessor.

The microprocessor is programmed to calculate a first pressure required for engaging the clutch in an idle running state of the engine, calculate a second pressure required for torque transmission of the continuously variable transmission based on the torque transmission amount of the clutch and the speed ratio of the continuously variable transmission, and control the valve to set the line pressure equal to the first pressure during a first set time from when a supply of the line pressure to the clutch has started, while setting the line pressure equal to a specific pressure based on the second pressure when the load of the engine becomes equal to or greater than a first set value during the first set time.

This invention also provides a control method of a line pressure used by a continuously variable transmission and a clutch connected in series for transmitting a torque generated by an engine of a vehicle.

The method comprises detecting a load of the engine, detecting a torque transmission amount of the clutch, detecting a speed ratio of the continuously variable transmission, calculating a first pressure required to engage the clutch in an idle running state of the engine, calculating a second pressure required for torque transmission of the continuously variable transmission based on the torque transmission amount of the clutch and the speed ratio of the continuously variable transmission, and controlling the line pressure to be equal to the first pressure during a first set time from when a supply of the line pressure to the clutch has started, while controlling the line pressure equal to a specific pressure based on the second pressure when the load of the engine becomes equal to or greater than a first set value during the first set time.

The details as well as other features and advantages of this invention are set forth in the remainder of the specification and are shown in the accompanying drawings.

BRIEF DESCRIPTION OF THE DRAWINGS

FIGS. 7A–7D are timing charts describing a line pressure control performed by the control unit.

FIG. 8 is a diagram showing the relation between the basic engaging pressure $P_{SEL}$, a clutch required pressure $P_{CLU}$, and a CVT required pressure $P_{CVT}$ with respect to a throttle opening of an engine.

DESCRIPTION OF THE PREFERRED EMBODIMENTS

Figure 1:
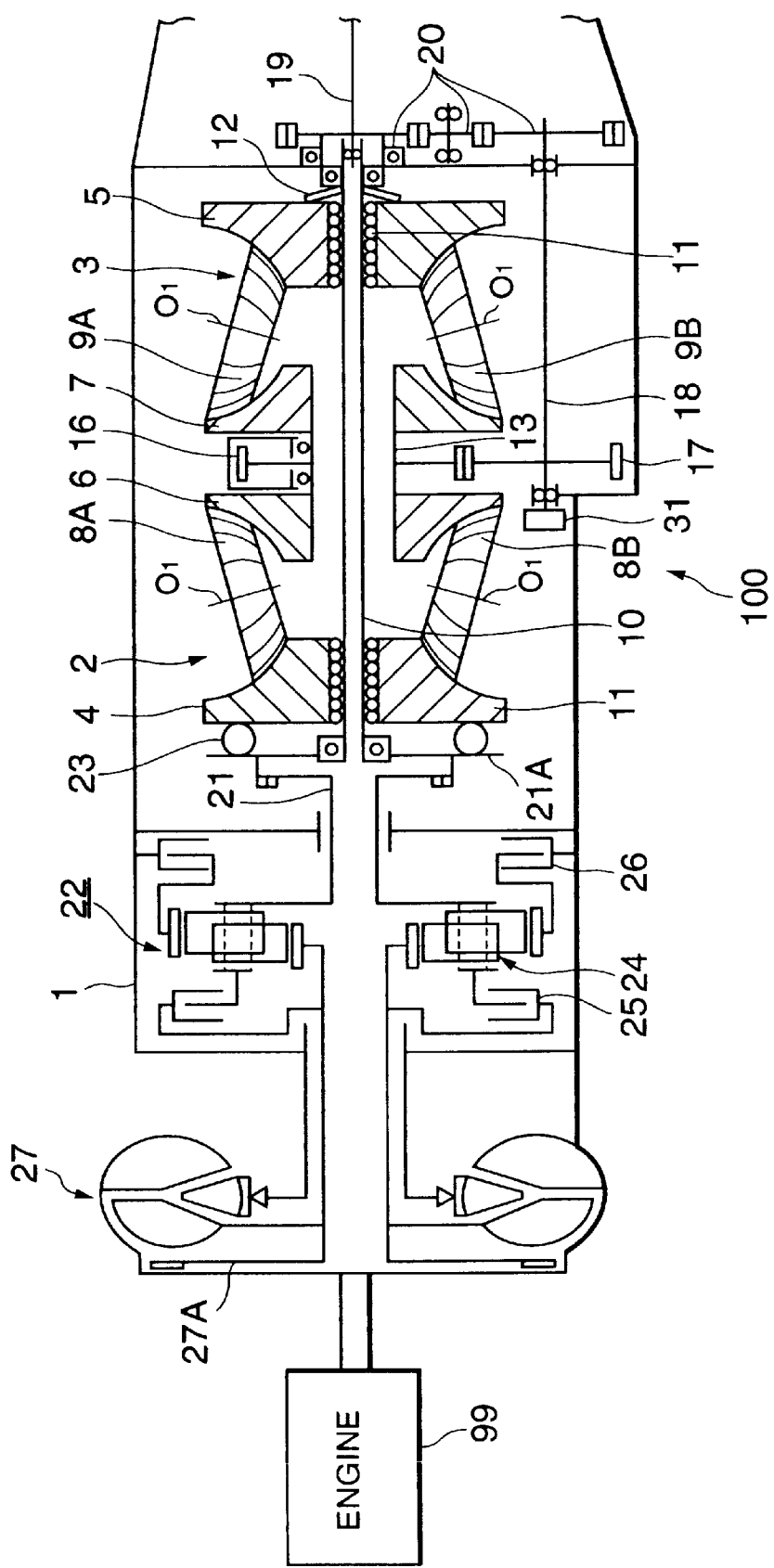
FIG. 1 is a schematic diagram of a drive train of a vehicle to which this invention is applied.

Referring to FIG. 1 of the drawings, a double cavity toroidal continuously variable transmission (referred to hereafter as toroidal CVT) 100 for a vehicle is provided with two sets of toroidal units 2, 3 housed in a case 1.

The toroidal unit 2 is provided with a pair of power rollers 8A, 8B gripped between an input disk 4 and output disk 6.

The toroidal unit 3 is provided with a pair of power rollers 9A, 9B gripped by an input disk 5 and output disk 7.

The input disks 4 and 5 are respectively joined via a ball spline 11 on a shaft 10. They are supported so that their relative rotation to the shaft 10 is restricted, but so that they can displace along the shaft 10. The input disk 5 is pushed towards the output disk 7 by a pre-loading disk spring 12.

An input shaft 21 is coaxially disposed with the shaft 10.

Cam rollers 23 which generate a thrust force due to the rotation of the shaft 21 are arranged between a cam flange 21A fixed to the input shaft 21 and the input disk 4. Due to this thrust force, the input disk 4 pushes the power rollers 8A, 8B against the output disk 6.

This thrust force is also transmitted to the input disk 5 via the shaft 10 and disk spring 12, and the input disk 5 pushes the power rollers 9A, 9B against the output disk 7.

The output disks 6 and 7 are fixed to a hollow shaft 13 fitted free to rotate on the outer circumference of the shaft 10.

The rotation of the hollow shaft 13 is output to an output shaft 19 via an output gear 16, counter gear 17, counter shaft 18, and intermediate gears 20.

The input shaft 21 is connected to a forward/reverse change-over device 22.

The forward/reverse change-over device 22 comprises a double pinion planetary gear set 24, forward clutch 25 and reverse brake 26.

When the forward clutch 25 is engaged, the forward/reverse change-over device 22 transmits the output rotation of a torque converter 27 without modification to the input shaft 21.

When the reverse brake 26 is tightened, the output rotation of the torque converter 27 is reversed and transmitted to the input shaft 21.

The torque converter 27 increases the output torque of an engine 99 and absorbs torque fluctuations by a fluid-based torque transmission.

The torque converter 27 also comprises a lock-up clutch 27A which directly transmits the output torque of the engine 99 without going through fluid.

Figure 2A:
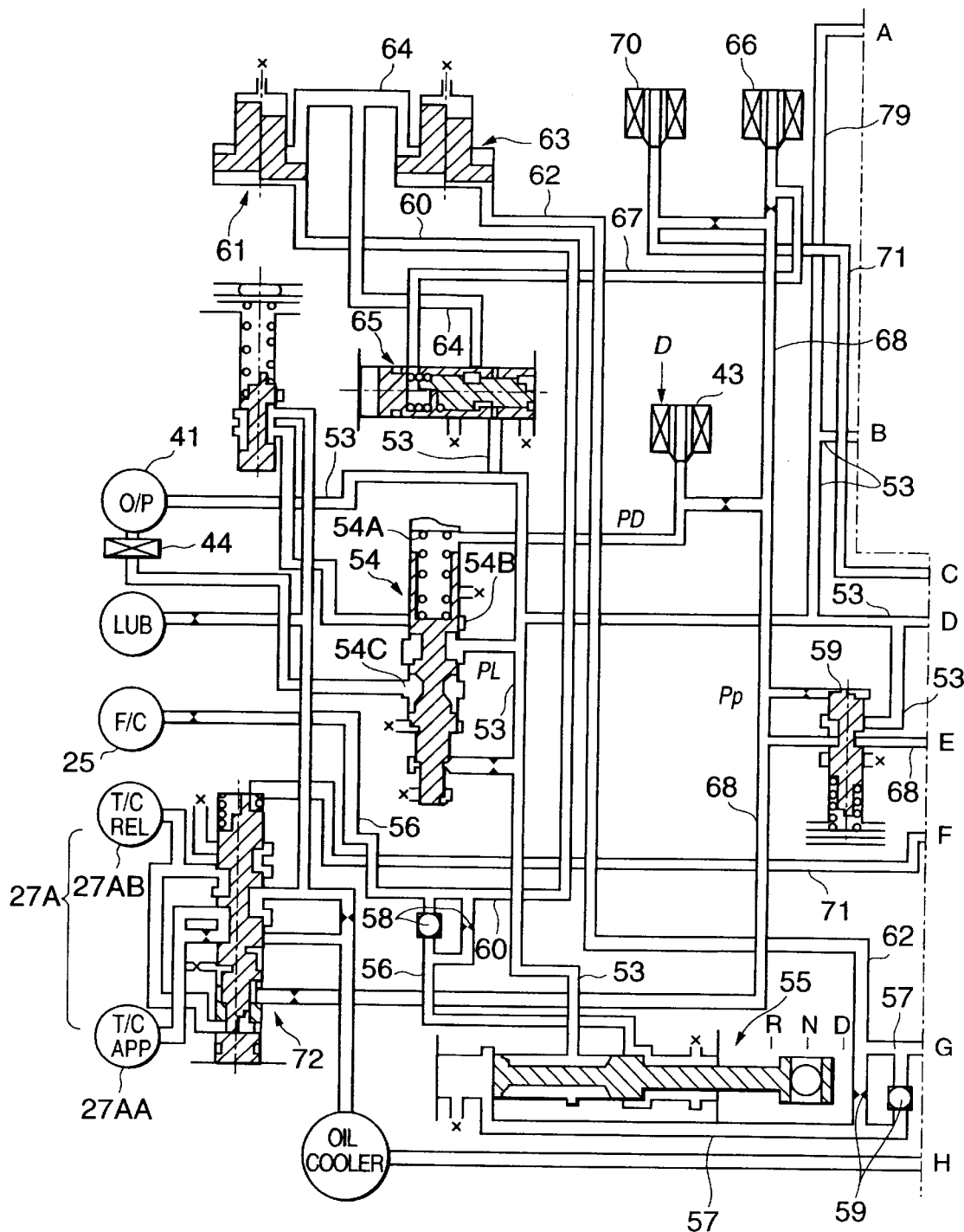
FIGS. 2A and 2B are oil pressure circuit diagrams of a toroidal continuously variable transmission which constitutes the drive train of the vehicle.
Figure 2B:
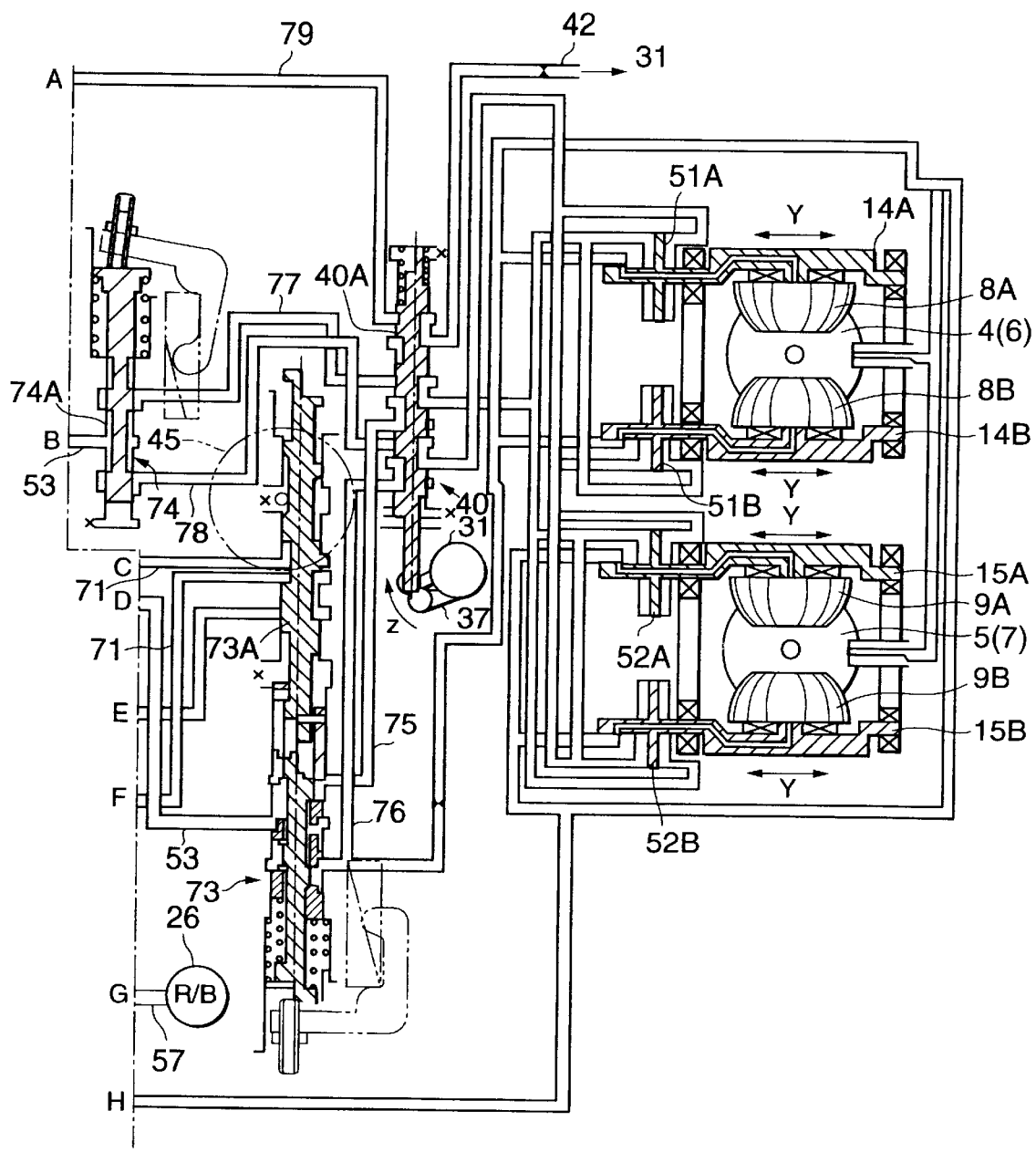

Next, referring to FIG. 2B, the power rollers 8A, 8B, 9A and 9B are respectively supported by trunnions 14A, 14B, 15A and 15B.

Servo pistons 51A, 51B, 52A, and 52B driven by oil pressure are respectively attached to the trunnions 14A, 14B, 15A and 15B.

Figure 3:
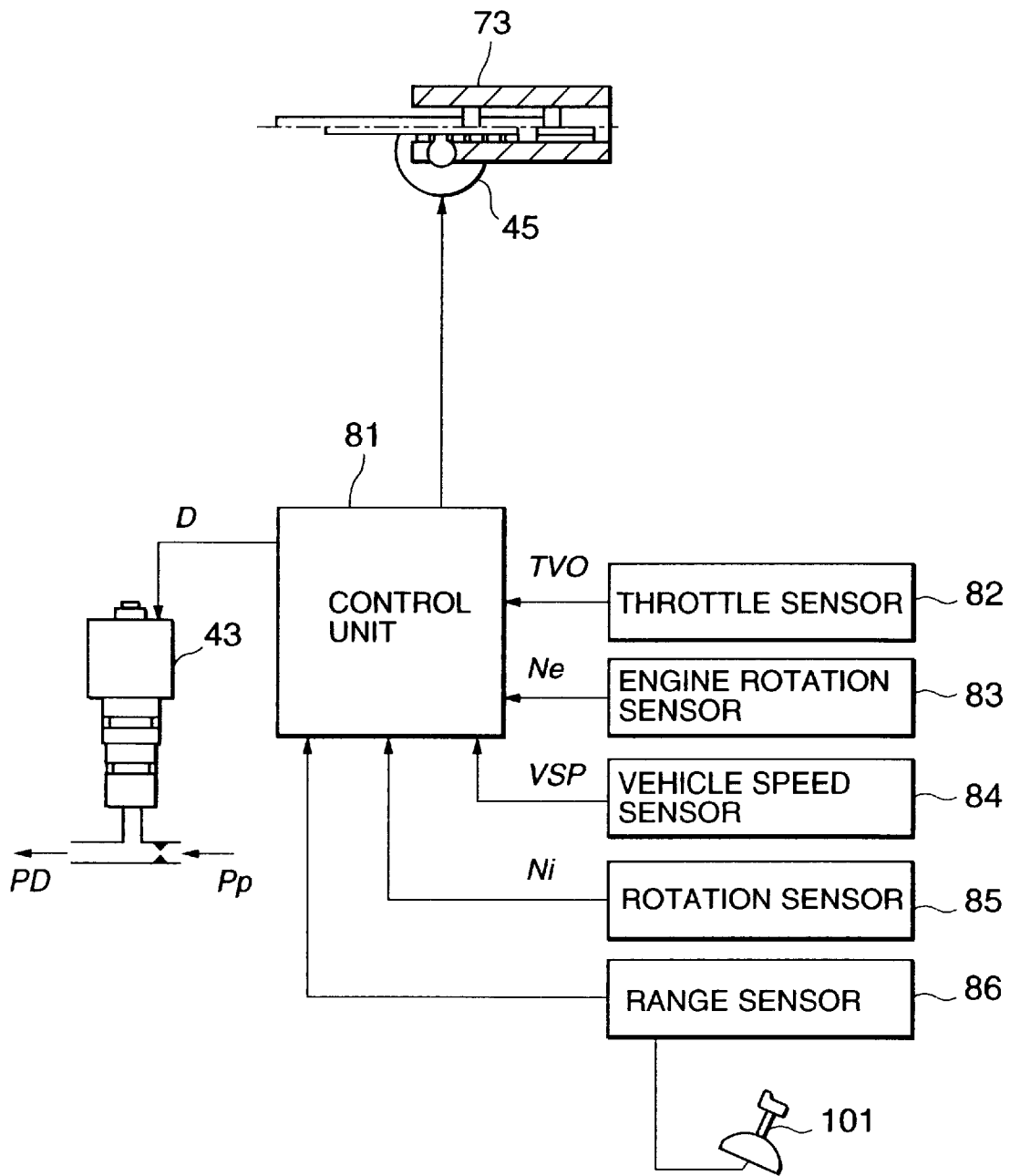
FIG. 3 is a schematic diagram of a line pressure control device according to this invention.

The trunnions 14A, 14B, 15A, 15B displace around trunnion rotation axes perpendicular to the rotation axes O1 of the power rollers 8A, 8B, 9A, 9B shown in FIG. 1, i.e., in the direction of the arrow Y in FIG. 3, under the drive of the servo pistons 51A, 51B, 52A, 52. Consequently, the contact points between the power rollers 8A, 8B, 9A 9B, the input disks 4, 5 and the output disks 6, 7 change, and the power rollers 8A, 8B, 9A, 9B undergo a gyration around the respective trunnion rotation axes together with the trunnions 14A, 14B, 15A, 15B.

As a result, the rotation speed ratio of the input disks 4, 5 and the output disks 6, 7, i.e., the speed ratio of the toroidal CVT 100 varies.

The gyration angle of the power rollers 8A, 8B, 9A, 9B corresponds therefore directly to the speed ratio.

An oil circuit is formed to exert an oil pressure on the servo pistons 51A, 51B, 52A, 52 so that the trunnions 14A, 15A displace in the same direction and the trunnions 14B, 15B displace in the opposite direction to this.

When torque Is transmitted to the output disks 6, 7 from the input disks 4, 5 via the power rollers 8A, 8B, 9A, 9B, a reaction force due to the torque transmission acts on the power rollers 8A, 8B, 9A, 9B.

This reaction force is supported by the servo pistons 51A, 51B, 52A, 52B via the trunnions 14A, 14B, 15A, 15B.

Therefore, in the working of a toroidal CVT 100, i.e., the state where the toroidal CVT 100 is transmitting torque, the oil pressure circuit exerts an oil pressure according to the magnitude of the reaction force on the servo pistons 51A, 51B, 52A, 52B. Such a torque transmission of a CVT is disclosed in Tokkai Hei 11-247964 published by the Japanese Patent Office in 1999.

Next, the oil pressure circuit of the toroidal CVT 100 will be described referring to FIGS. 2A and 2B.

The oil pressure circuit is fundamentally the same as that of the circuit disclosed by Tokkai Hei 4-78366 published by the Japanese Patent Office in 1992.

The servo pistons 51A, 51B, 52A, 52B are driven ovary the gyration angle of the power rollers 8A, 8B, 9A, 9B, and when the gyration angle coincides with a target gyration angle, the displacement of the trunnions 14A, 14B, 15A, 15B in the direction of the arrow Y returns to zero due to a feedback mechanism. FIGS. 2A and 2B show an identical oil pressure circuit divided into two parts by a line A–H.

The oil pressure circuit supplies discharge oil from an oil pump 41 to the forward clutch 25, reverse brake 26, change-over valve 40, lubricating oil spray nozzle 42 for lubricating a reverse sensor 31, and the servo pistons 51A, 51B, 52A, 52B.

The oil pump 41 is driven by the engine 99, and supplies a pressurized oil to a line pressure circuit 53.

A pressure regulator valve 54 adjusts the pressure of the line pressure circuit 53 to a predetermined line pressure PL.

The line pressure PL is input into a manual valve 55 which is manually operated directly by a driver of the vehicle.

The manual valve 55 is associated with a selector lever 101 shown in FIG. 3 with which the vehicle is provided, and seals the line pressure PL of the line pressure circuit 53 when the selector lever 101 selects a neutral range (N).

When the selector lever 101 selects a drive range (D), it outputs the line pressure PL to a circuit 56.

When the selector lever 101 selects a reverse running range (R), it outputs the line pressure PL to a circuit 57.

The line pressure PL supplied to the circuit 56 engages the forward clutch 25 via a one-way orifice 58.

The one-way orifice 58 limits the inflow rate of oil to the forward clutch 25, and does not give any resistance to outflow of oil from the forward clutch 25.

The circuit 56 is connected to a forward clutch accumulator 61 via a circuit 60.

The rate of increase of the engaging pressure of the forward clutch 25 is limited by operation of the accumulator 61 and the one-way orifice 58.

This limitation alleviates the engaging shock of the forward clutch 25, i.e., the shock which occurs when the selector lever 101 is changed over to the drive range from the neutral range.

The line pressure PL supplied to the circuit 57 engages the reverse brake 26 via a one-way orifice 59.

The one-way orifice 59 limits the inflow rate of oil to the reverse brake 26, and does not give any resistance to outflow of oil from the reverse brake 26.

The circuit 57 is connected to a reverse brake accumulator 63 via a circuit 62.

The rate of increase of the engaging pressure of the reverse brake 26 is limited by operation of the accumulator 63 and the one-way orifice 59.

This limitation alleviates the engaging shock of the reverse brake 26, and the shock which occurs when the selector lever 101 is changed over to the reverse range from the neutral range.

In order to absorb these shocks effectively, a common accumulator back pressure is supplied to the accumulators 61, 63 from a circuit 64.

An accumulator control valve 65 generates the accumulator back pressure.

The accumulator control valve 65 generates the accumulator back pressure from the line pressure PL of the line pressure circuit 53 according to a signal pressure supplied via a circuit 67 from a duty solenoid 66 for accumulator back pressure control. The duty solenoid 66 for accumulator back pressure control converts a pilot pressure Pp of a pilot pressure circuit 68 into a signal pressure according to a duty signal which is input. The pilot pressure Pp is a constant pressure generated by the pilot valve 68 from the line pressure PL.

The pilot pressure Pp of the circuit 68 is used also for control of the lock-up clutch 27A of the torque converter 27 by a lock-up solenoid 70.

According to a duty signal input, the lock-up solenoid 70 converts the pilot pressure Pp of the pilot pressure circuit 68 into a lock-up control pressure, and outputs it to a circuit 71.

When the circuit 71 is at low pressure, a lock-up control valve 72 shown in FIG. 2A is held in a position on the right-hand side of a center line, and an oil pressure is supplied to an engaging chamber 27AA of the lock-up clutch 27A.

Consequently, the torque converter 27 transmits torque directly by the lock-up clutch 27A without the intervention of fluid.

On the other hand, when the circuit 71 is at high pressure, the lock-up control valve 72 shown in FIG. 2A is held in a position on he left-hand side of the center line, and an oil pressure is supplied to a release chamber 27AB of the lock-up clutch 27A.

Consequently, the torque converter 27 transmits a torque via fluid.

The pilot pressure Pp of the pilot pressure circuit 68 is used also for line pressure control by a line pressure solenoid 43.

According to an input duty signal D, the line pressure solenoid 43 generates a duty pressure PD from the pilot pressure Pp, and supplies it to the pressure regulator valve 54.

The duty pressure PD assists a spring 54A of the pressure regulator valve 54, and increases the line pressure PL of the circuit 53 by reducing a drain amount to a first drain port 54B from the line pressure circuit 53.

When the discharge amount of the oil pump 41 increases due to rise of the engine rotation speed Ne, and the line pressure PL rises, the pressure regulator valve 54 strokes to the upper part of FIG. 2 due to the line pressure PL.

Consequently, the line pressure circuit 53 communicates with a second drain port 54C. Oil which was drained from the second drain port 54C returns to the suction port of the oil pump 41 via an oil strainer 44.

Therefore, the pressure regulator valve 54 also has the function of reducing the intake negative pressure of the oil pump 41.

The oil pressure circuit comprises a forward speed ratio control valve 73 and a reverse speed ratio control valve 74 shown in FIG. 2B in order to drive the servo pistons 51A, 51B, 52A, 52B.

The forward speed ratio control valve 73 and reverse speed ratio control valve 74 work together with the change-over valve 40 so that speed ratio control when the vehicle is moving forward or reversing, is performed to realize preferred shifting characteristics for forward and reverse motions of the vehicle.

The forward speed ratio control valve 73 is driven by a step motor 45.

The step motor 45 displaces a spool 73A of the forward speed ratio control valve 73 corresponding to a speed ratio command signal I, and outputs the line pressure PL of the line pressure circuit 53 to a circuit 75 or circuit 76.

When the change-over valve 40 is in the forward position, i.e., when a spool 40A of the change-over valve 40 shown in FIG. 2B is in a position on the left side of the center line, the oil pressure of the circuits 75, 76 exerts a pressure in the speed ratio increasing or decreasing direction on the servo pistons 51A, 51B, 52A 52B. On the other hand, when the change-over valve 40 is in the reverse position, i.e., when the spool 40A of the change-over valve 40 shown in FIG. 2B is on the right-hand side of the center line, the circuit 75 and circuit 76 are closed by the change-over valve 40.

The reverse speed ratio control valve 74 supplies the line pressure of the line pressure circuit 53 to a circuit 77 or circuit 78 according to the displacement of a spool 74A. When the change-over valve 40 is in the reverse position, i.e., when the spool 40A of the change-over valve 40 shown in FIG. 2B is in a position on the right-hand side of the center line, the oil pressure of the circuits 77, 78 exerts a pressure in the speed ratio increasing or decreasing direction on the servo pistons 51A, 51B, 52A 52B. On the other hand, when the change-over valve 40 is in the forward position, i.e., when the spool 40A of the change-over valve 40 shown in FIG. 2B is on the left-hand side of the center line, the circuit 75 and circuit 76 are closed by the change-over valve 40.

The spool 40A of the change-over valve 40 is driven by a sensor arm 37 of the reverse sensor 31.

The reverse sensor 31 is joined to the counter shaft 18 shown in FIG. 1 through a one-way clutch, not shown. Referring again to FIG. 2B, the tip of the sensor arm 37 comes in contact with one end of the spool 40A of the change-over valve 40.

When the counter shaft 18 rotates in a forward direction, the one-way clutch races, and force is not exerted on the sensor arm 37.

On the other hand, when the counter shaft 18 rotates in a reverse direction, the one-way clutch rotates the sensor arm 37 in the direction of the arrow Z of FIG. 2B.

The function and structure of the reverse sensor 31 are well-known from Tokkai Hei 2-163562 published by the Japanese Patent Office in 1990.

In the reverse position, the change-over valve 40 also supplies the line pressure PL, which is supplied from the line pressure circuit 53 via a circuit 79, to the lubricating oil spray nozzle 42 and performs lubrication of the reverse sensor 31.

Next, referring to FIG. 3, a duty signal D supplied to the line pressure solenoid 43 and a speed ratio command signal I supplied to the step motor 45, are output from a control unit 81.

The control unit 81 comprises a microcomputer comprising a central processing unit (CPU), read-only memory (ROM), random access memory (RAM)), and an input/output interface (I/O interface).

To determine the duty signal D and speed ratio command signal I, signals are input to the control unit 81 from a throttle opening sensor 82 which detects a throttle opening TVO of the engine 99, an engine rotation sensor 83 which detects a rotation speed Ne of the engine 99, a vehicle speed sensor 84 which detects a vehicle speed VSP, a rotation sensor 85 which detects a rotation speed Ni of the input shaft 21 of the toroidal CVT 100, and a range sensor 86 which detects the selection range of the selector lever 101.

From the throttle opening TVO and vehicle speed VSP, the control unit 81 looks up a prestored speed ratio control map, and determines a target rotation speed of the input shaft 21.

The speed ratio command signal I corresponding to the target rotation speed is output to the step motor 45.

The speed ratio of the toroidal CVT 100 is made to correspond with the speed ratio command signal I by the step motor 45 displacing a spool 73A of the forward speed ratio control valve 73 to a position corresponding to the speed ratio command signal I.

Figure 4:
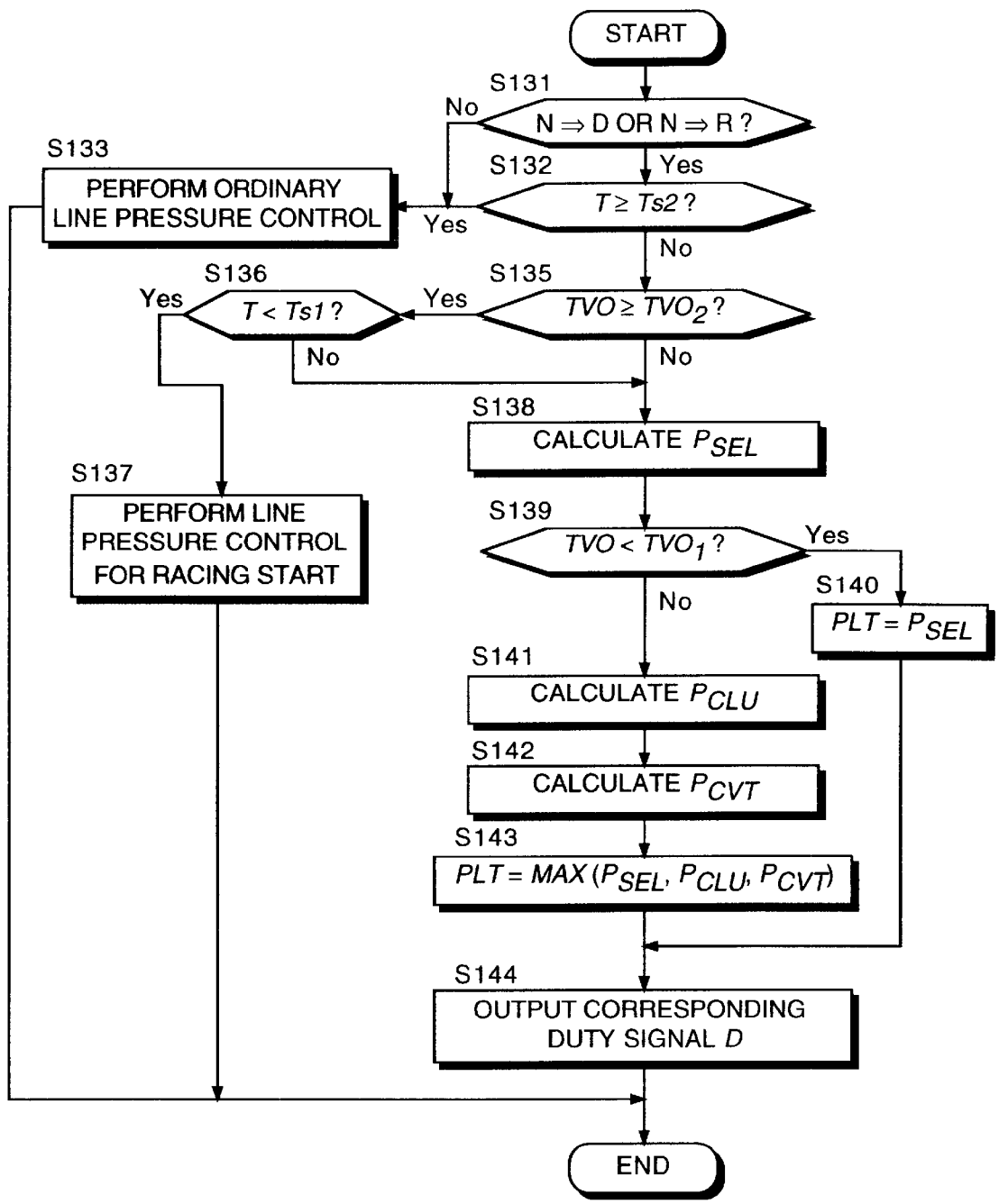
FIG. 4 is a flowchart describing a line pressure control routine performed by a control unit according to this invention.

On the other hand, the control unit 81 performs a line pressure control routine shown in FIG. 4, determines the duty signal D, and outputs it to the line pressure solenoid 43.

This routine is performed at a fixed interval of 10 milliseconds during the running of the engine 99.

First, in a step S131, the routine determines whether or not the selector lever 101 was switched to the drive range (D) or the reverse range (R) from the neutral range (N) based on the input signal from the range sensor 86.

When the selector lever 101 was changed over to the drive range (D) or reverse range (R) from the neutral range (N), the routine determines, in a step 132, whether or not an elapsed time T after the change-over has reached a set time Ts2.

The set time Ts2 is a value set beforehand based on the time required for the forward clutch 25 or reverse brake 26 of the forward/reverse change-over device 22 to engage after the change-over operation of the selector lever 101.

When the change-over to the drive range (D) or reverse range (R) from the neutral range (N) was not detected in the step S131 or the elapsed time T has reached the set time Ts2 in the step S132, the routine proceeds to a step S133. In this step, the duty signal D is output to the line pressure solenoid 43 by ordinary line pressure control, and the routine is terminated.

On the other hand, when the elapsed time T has not reached the set time Ts2 in the step S132, the routine proceeds to a step S135.

Here, it is determined whether or not the throttle opening TVO is equal to or greater than a set opening $TVO_2$.

When the throttle opening TVO is equal to or greater than the set opening $TVO_2$, it is determined in a step S136 whether or not the elapsed time T has reached a set time Ts1.

Here, the relation Ts1<Ts2 holds.

When the elapsed time T has not reached the set time Ts1, the routine proceeds to a step S137.

Figure 5:
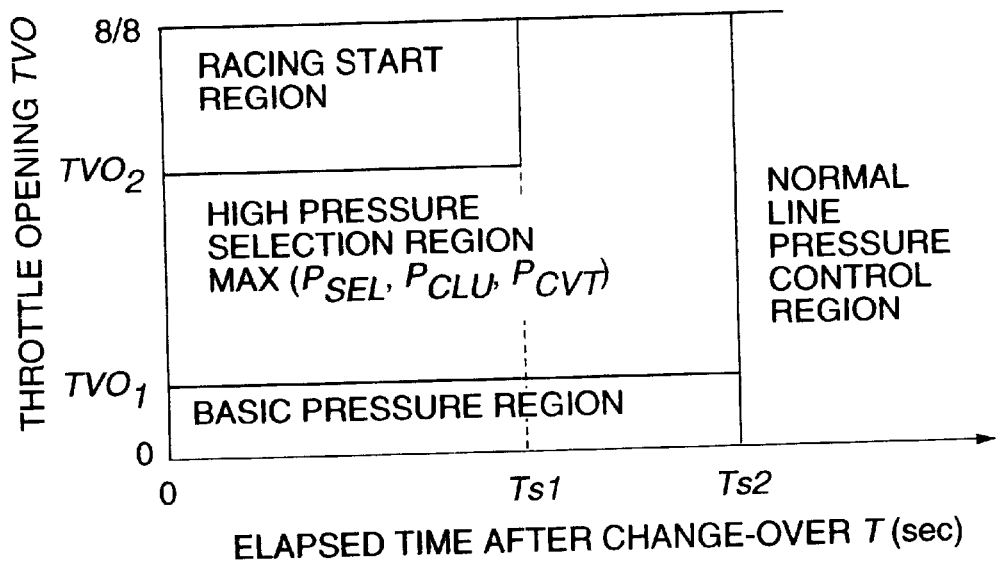
FIG. 5 is a diagram of line pressure control regions recognized by the control unit.

Here, the line pressure control for a racing start is performed. Racing start refers to the case where an accelerator pedal of the vehicle is depressed and the engine rotation speed Ne is increased, and an operation is performed to make a change-over to the drive range (D) or reverse range (R) from the neutral range (N). Racing start occurs only in a region where the throttle opening TVO>$TVO_2$ and the elapsed time T<Ts1, as shown in FIG. 5.

In this region, in order to suppress the occurrence of an extreme peak torque due to racing start, a target line pressure PLT is set low and the forward clutch 25 or the reverse brake 26 is made to slip intentionally.

For this purpose, the target line pressure PLT is set lower than the basic engaging pressure $P_{SEL}$ required for engaging of the forward clutch 25 or the reverse brake 26 in the idle state of the engine 99 where the throttle opening TVO is zero. The pressure required for engaging of the forward clutch 25 and the pressure required for engaging of the reverse brake 26 are different, so the basic engaging pressure $P_{SEL}$ is different in the case where a change-over is performed from the neutral range (N) to the drive range (D), and the case where a change-over is performed from the neutral range (N) to the reverse range (R).

The basic engaging pressure $P_{SEL}$ for the forward clutch 25 and the basic engaging pressure $P_{SEL}$ for the reverse brake 26 may be considered as fixed values which are generally applied in the idle running state. They may be different from the basic engaging pressure $P_{SEL}$ that will be calculated in a following step S138.

Now, when the throttle opening TVO is smaller than the set opening $TVO_2$ in the step S135 or the elapsed time T has reached the set time Ts1 in the step S136, the routine proceeds to the step S138.

In describing the step S138 and subsequent steps, the change-over from the neutral range (N) to the drive range (D) has been taken as an example in order to simplify the description, but the process is the same for a change-over from the neutral range (N) to the reverse range (R) except that the applied values are different.

Figure 6:
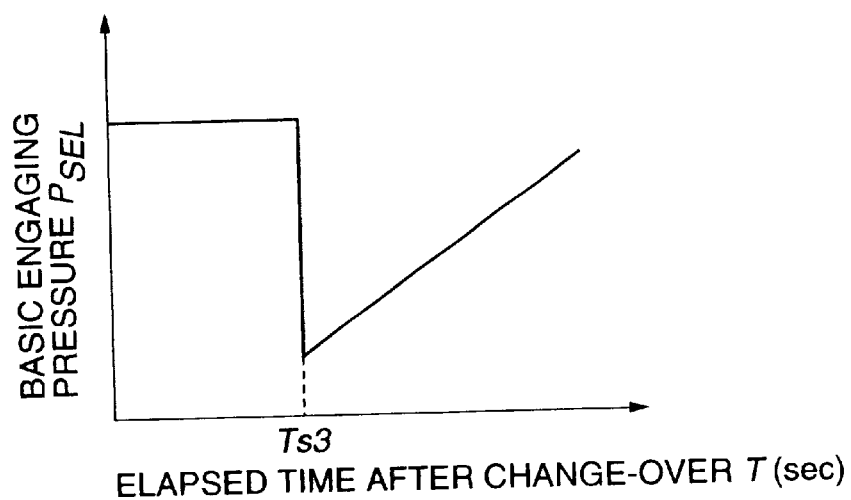
FIG. 6 is a diagram showing the contents of a map of a basic engaging pressure stored by the control unit.

In the step S138, the basic engaging pressure $P_{SEL}$ is calculated based on a map shown in FIG. 6.

Referring to the map of FIG. 6, until the elapsed time T reaches a set time Ts3, the initial value of the basic engaging pressure $P_{SEL}$ is set equal to the pressure required for the engaging of the forward clutch 25 when the throttle opening TVO is zero. However, when the elapsed time T reaches the set time Ts3, the basic engaging pressure $P_{SEL}$ is first reduced from the initial value, and then increases gradually with the increase in the elapsed time T.

The set time Ts3 is equivalent to a response delay time from when oil pressure feed to the forward clutch 25 is started until the forward clutch 25 starts engaging. The set time Ts2 is set to a longer time than the set time Ts3.

Such a setting of the basic engaging pressure $P_{SEL}$ has the following implication. Until the set time Ts3 has elapsed, a pressure corresponding to the initial value is supplied so that the forward clutch 25 starts engaging early. However, if a pressure corresponding to the initial value continues to be supplied even after the forward clutch 25 has started engaging, the forward clutch 25 engages abruptly and transmission of torque starts abruptly, hence the startup of the vehicle will not be performed smoothly.

Therefore, the engaging of the forward clutch 25 is made smooth by first lowering the supply pressure when engaging starts, and then gradually increasing the supply pressure.

However, the pressure required for engaging of the forward clutch 25 is different depending on the rotation speed Ne of the engine 99.

Even if the throttle opening TVO is zero, the idle rotation speed of the engine 99 varies with the operating state of auxiliary equipment such as an air-conditioner. It also varies according to the engine temperature. For example, when the engine is warming up, the idle ration speed of the engine increases.

Therefore, two maps may be used selectively depending on whether or not auxiliary equipment is operating.

In a following step S139, it is determined whether or not the throttle opening TVO is smaller than a set opening $TVO_1$. Referring to FIG. 5, when the throttle opening TVO is smaller than the set opening $TVO_1$, it implies that the line pressure control conditions correspond to a basic pressure region or idle running region.

On the other hand, if the throttle opening TVO is not smaller than the set opening $TVO_1$, it implies that the line pressure control conditions correspond to a high pressure selection region.

When the engine 99 is running idle, the throttle opening is zero, but here the set opening $TVO_1$ which is the boundary between the two regions is set to be larger than zero. If this value is set to be zero, the line pressure control changes merely by touching the accelerator pedal with the foot. Therefore, a certain width is given to the basic pressure region from the viewpoint of control stability.

When the basic pressure region is determined in the step S139, the routine proceeds to a step S140.

Here, the basic engaging pressure $P_{SEL}$ found in the step S138 is set to the target line pressure PLT, and the corresponding duty signal D is output to the line pressure solenoid 43 in a step S144, and the routine is terminated.

When the high pressure selection region is determined in the step S139, the routine performs the processing of the steps S141–S144.

First, in the step S141, a clutch required pressure $P_{CLU}$ is calculated. The clutch required pressure $P_{CLU}$ is the engaging force of the forward clutch 25 required to transmit the output torque of the engine 99 to the toroidal CVT 100. The clutch required pressure $P_{CLU}$ therefore has a fixed relation with an amount of torque transmitted by the forward clutch 25. Since the forward/reverse change-over device 22, i.e., the forward clutch 25, is disposed between the torque converter 27 and the toroidal CVT 100, providing that the forward clutch 25 is under sufficient engaging pressure, the output torque of the torque converter 27 is equal to the input torque Ti of the toroidal CVT 100. So, in the step S141, the input torque Ti of the toroidal CVT 100 is calculated as a torque transmission amount of the forward clutch 25.

The speed ratio e=Ne/Ni of the torque converter 27 is calculated from the engine rotation speed Ne and the rotation speed Ni of the input shaft 21. Based on the speed ratio e of the torque converter 27, a torque ratio TR of the torque converter 27 is found by looking up a prestored map.

On the other hand, an output torque Te of the engine 99 is calculated from the rotation speed Ne and the throttle opening TVO of the engine 99.

By multiplying the output torque Te of the engine 99 by the torque ratio TR, the input torque Ti of the toroidal CVT 100 is calculated.

This calculation of the input torque Ti of the above continuously variable transmission is well-known from U.S. Pat. No. 5,841,416.

Next, the clutch required pressure $P_{CLU}$ is calculated by the following equation using the input torque Ti.

$$P_{CLU} = A \cdot Ti + B$$

where,

A=constant, and
B=constant.

The clutch required pressure $P_{CLU}$ thus calculated has the relation shown in FIG. 8 to the throttle opening TVO which represents the load of the engine 99.

In the following step S142, a CVT required pressure $P_{CVT}$ that the toroidal CVT 100 requires in order to maintaining the current speed ratio is found.

For this purpose, a speed ratio Ic of the toroidal CVT 100 is found from the input rotation speed Ni of the toroidal CVT 100 and the vehicle speed VSP, and the CVT required pressure $P_{CVT}$ is found from the following equation.

$$P_{CVT} = Ic \cdot Ti$$

The CVT required pressure $P_{CVT}$ calculated in this way has the relation shown in FIG. 8 to the throttle opening TVO corresponding to the throttle opening TVO of the engine 99.

In the following step S143, the largest value Max ($P_{SEL}$, $P_{CLU}$, $P_{CVT}$) of the basic engaging pressure $P_{SEL}$, clutch required pressure $P_{CLU}$ and CVT required pressure $P_{CVT}$ is set to the target line pressure PLT.

In the step S144, the duty signal D corresponding to the target line pressure PLT is output to the line pressure solenoid 43, and the routine is terminated.

In the case of change-over from the neutral range (N) to the reverse range (R), the same processing is performed regarding the engaging of the reverse brake 26.

In the above routine, the set time Ts2 corresponds to a first set time, the set time Ts1 corresponds to a second set time, and the set time Ts3 corresponds to a third set time. The set opening $TVO_1$ corresponds to a first set value of an engine load, and the set opening $TVO_2$ corresponds to a second set value of the engine load. The basic engaging pressure $P_{SEL}$ corresponds to a first pressure, the CVT required pressure $P_{CVT}$ corresponds to a second pressure, and the clutch required pressure $P_{CLU}$ corresponds to a third pressure.

Next, the variation of the line pressure PL when the vehicle starts under the above routine will be described referring to FIGS. 7A–7D.

The driver changes the selector lever 101 over to the drive range (D) from the neutral range (N) at a time t1, as shown in FIG. 7A.

The driver feels the engaging of the forward clutch 25 from the decline of the rotation speed Ne of the engine 99, etc., at a time t2 before the set time Ts2 elapses.

Then, the driver depresses the accelerator pedal to start the vehicle, and increases the throttle opening TVO of the engine 99 to an opening $TVO_3$ larger than the set opening $TVO_1$ shown in FIG. 3.

As a result, after the time t2, the target line pressure PLT is set to the largest value Max ($P_{SEL}$, $P_{CLU}$, $P_{CVT}$) of the basic engaging pressure $P_{SEL}$, clutch required pressure $P_{CLU}$ and the CVT required pressure $P_{CVT}$, and for example varies as shown by a curve β of FIG. 7C.

Referring to FIG. 8, in the state where the accelerator pedal is depressed, the CVT required pressure $P_{CVT}$ is the largest of the basic engaging pressure $P_{SEL}$, clutch required pressure $P_{CLU}$, and CVT required pressure $P_{CVT}$.

Therefore, the curve β shown in FIG. 7C corresponds to the CVT required pressure $P_{CVT}$.

Since the target line pressure PLT rises to the CVT required pressure $P_{CVT}$ as soon as the throttle opening TVO reaches the set throttle opening $TVO_3$, there is no risk of interruption of CVT operation due to insufficient line pressure. In other words, quick operation of the toroidal CVT 100 is assured.

In FIG. 8, the CVT required pressure $P_{CVT1}$ at the throttle opening $TVO_3$ is larger than the clutch required pressure $P_{CLU1}$, but this may not always be the case. However, since the largest value of three pressures is set to the target line pressure PLT, the pressure required for torque transmission of the forward clutch 25 is also ensured.

In the above embodiment, the case was described where the engine 99 and toroidal CVT 100 were connected via a forward clutch 25 and reverse brake 26, but this invention may be applied also to the case where a belt CVT is used instead of the toroidal CVT 100.

The contents of Tokugan Hei 11-278668, with a filing date of Sept. 30, 1999 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

What is claimed is:

1. A line pressure control device for a vehicle, the vehicle comprising an engine, a continuously variable transmission and a clutch, the transmission and the clutch being connected in series to the engine to transmit a torque according to a line pressure, the device comprising:

a valve which regulates the line pressure, a sensor which detects a load of the engine, a sensor which detects a torque transmission amount of the clutch, a sensor which detects a speed ratio of the continuously variable transmission, and a microprocessor programmed to:

calculate a first pressure required for engaging the clutch in an idle running state of the engine, calculate a second pressure required for torque transmission of the continuously variable transmission based on the torque transmission amount of the clutch and the speed ratio of the continuously variable transmission, and control the valve to set the line pressure equal to the first pressure during a first set time from when a supply of the line pressure to the clutch has started, while setting the line pressure equal to a specific pressure based on the second pressure when the load of the engine becomes equal to or greater than a first set value during the first set time.

2. The line pressure control device as defined in claim 1, wherein the microprocessor is further programmed to calculate a third pressure required for torque transmission of the clutch based on the torque transmission amount of the clutch, and determine the specific pressure equal to the highest of the first pressure, second pressure and the third pressure.

3. The line pressure control device as defined in claim 1, wherein the microprocessor is further programmed to control the valve to restrict the line pressure from exceeding the first pressure when the load of the engine becomes equal to or greater than a second set value which is larger than the first set value within a second set time shorter than the first set time after the supply of the line pressure to the clutch has started, and control the valve to set the line pressure equal to the specific pressure during a time corresponding to the difference of the first set time and the second set time after the second set time has elapsed.

4. The line pressure control device as defined in claim 1, wherein the microprocessor is further programmed to set the first pressure at an initial value for a third set time shorter than the first set time after the supply of the line pressure to the clutch has started, set the first pressure smaller than the initial value when the third set time has elapsed, and gradually increase the first pressure toward the initial value after the third set time has elapsed.

5. The line pressure control device as defined in claim 1, wherein the engine comprises a throttle for adjusting an intake air amount, and the sensor which detects the load of the engine comprises a sensor which detects an opening of the throttle.

6. The line pressure control device as defined in claim 1, wherein the engine comprises a throttle for adjusting an intake air amount, the clutch is disposed between the engine and the transmission, the sensor which detects the torque transmission amount of the clutch comprises a sensor which detects an opening of the throttle, a sensor which detects a rotation speed of the engine and a sensor which detects an input rotation speed of the continuously variable transmission, and the microprocessor is further programmed to calculate a torque ratio from the rotation speed of the engine and input rotation speed of the continuously variable transmission, calculate an output torque of the engine from the opening of the throttle, and calculate the torque transmission amount of the clutch by multiplying the output torque of the engine by the torque ratio.

7. The line pressure control device as defined in claim 1, wherein the microprocessor is further programmed to calculate the second pressure by multiplying the speed ratio of the continuous variable transmission by the torque transmission amount of the clutch.

8. The line pressure control device as defined in claim 1, wherein the sensor which detects the speed ratio of the continuously variable transmission comprises a sensor which detects an input rotation speed of the continuously variable transmission, and a sensor which detects a running speed of the vehicle.

9. A control method of a line pressure used by a continuously variable transmission and a clutch connected in series for transmitting a torque generated by an engine of a vehicle, comprising:

detecting a load of the engine, detecting a torque transmission amount of the clutch, detecting a speed ratio of the continuously variable transmission, calculating a first pressure required to engage the clutch in an idle running state of the engine, calculating a second pressure required for torque transmission of the continuously variable transmission based on the torque transmission amount of the clutch and the speed ratio of the continuously variable transmission, and controlling the line pressure to be equal to the first pressure during a first set time from when a supply of the line pressure to the clutch has started, while controlling the line pressure equal to a specific pressure based on the second pressure when the load of the engine becomes equal to or greater than a first set value during the first set time.

\* \* \* \* \*